Sept. 6, 1938.                O. S. GIBBS                 2,129,055
                          MEASURING APPARATUS
                  Filed Feb. 14, 1938            3 Sheets-Sheet 1

INVENTOR
OWEN S. GIBBS

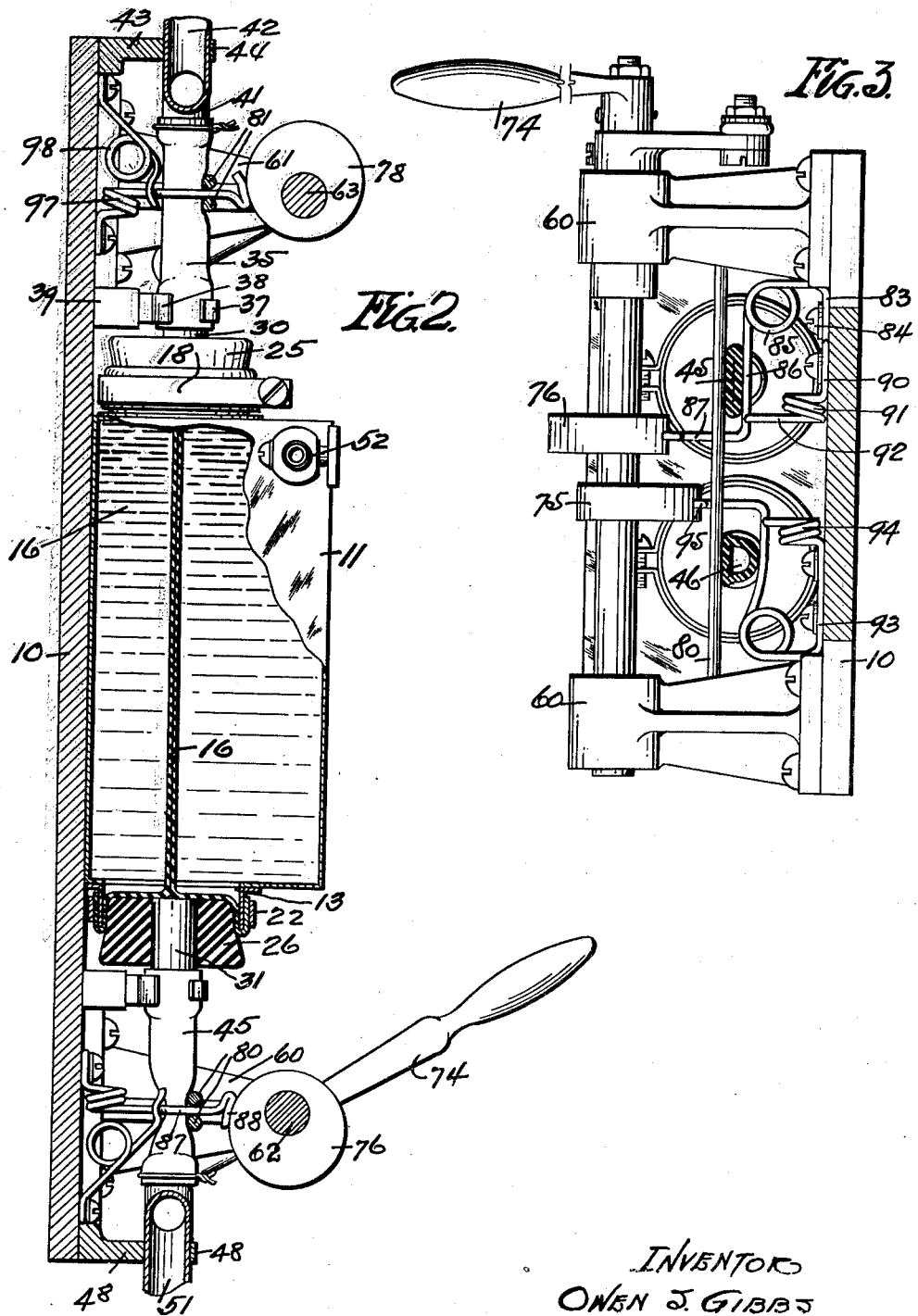

Sept. 6, 1938.   O. S. GIBBS   2,129,055
MEASURING APPARATUS
Filed Feb. 14, 1938   3 Sheets-Sheet 3
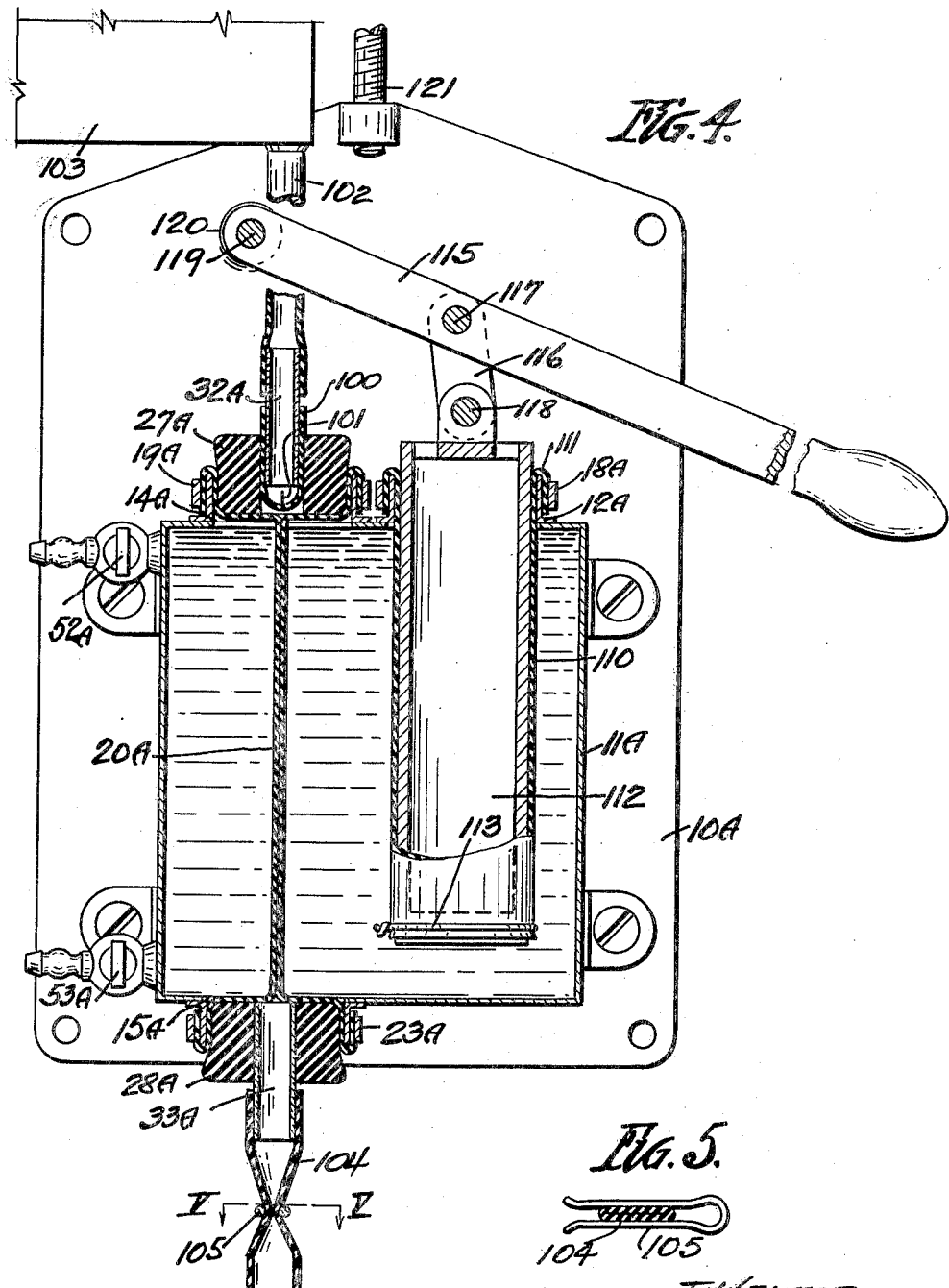

Patented Sept. 6, 1938

2,129,055

UNITED STATES PATENT OFFICE 2,129,055

MEASURING APPARATUS

Owen S. Gibbs, Memphis, Tenn.

Application February 14, 1938, Serial No. 190,410

9 Claims. (Cl. 221—103)

This invention relates to apparatus for measuring liquids and particularly to apparatus of this kind which may be set to measure and deliver a predetermined quantity of liquid, and which, when so set, may be operated to deliver such amount of liquid in repeated increments so long as it may be desired.

It has further reference to a device for the measurement of corrosive fluids. In handling corrosive liquids, special difficulties arise, owing to the fact that most metals commonly used in industry and commerce are unsuitable because of the corrosive effects of the liquids thereon. The construction of such apparatus, therefore, involves either the use of expensive special metals, or of other materials acted on only slightly, or not at all, by such liquids. Such special materials commonly available are glass, rubber and synthetic materials, such as "Bakelite", synthetic resins, phenolic derivatives, cellulose, artificial rubbers and the like. Often the substitution of such materials for metal in well known measuring devices is not practicable, owing to the cost, mechanical difficulties and other reasons. This being so, it is highly advisable to provide an instrument whose actual working parts, that is those parts in contact with the corrosive fluid, are noncorrosive and of the simplest possible nature, and which are easily and economically replaceable. Instruments of this class must be of rigid construction and simple in operation so that they may be handled by untrained parties and yet accurate results be obtained. In such an instrument also it is of extreme importance that the device be leak-proof and free from variation in measurement when in use.

In the following specification it will be understood that the term "non-corrosive" is intended to mean a material non-corrosive relative to the fluid to be measured.

The objects of the present invention are to make a measuring device which may be set to deliver a predetermined quantity of liquid, and which, when so set, may be repeatedly operated to deliver such amount of liquid at each subsequent operation.

A further object is to make a measuring device in which the fluid measured is separated at all times by a relatively non-corrosive material from the actuating mechanism.

A still further object is to improve the design and construction of such a mechanism.

The means by which the foregoing and other objects are accomplished and the method of their accomplishment will readily be understood from the following specification on reference to the accompanying drawings, in which:

Fig. 2 is a sectional elevation taken substantially along the line II—II of Fig. 1, the measuring bag, however, being shown collapsed at right angles to those shown in Fig. 1;

Fig. 3 is a sectional plan taken on the line III—III of Fig. 1;

Fig. 4 is a sectional elevation conforming to Fig. 1, of a modified form of the device; and Fig. 5 is a transverse section on the line V—V of Fig. 4.

Figure 1:
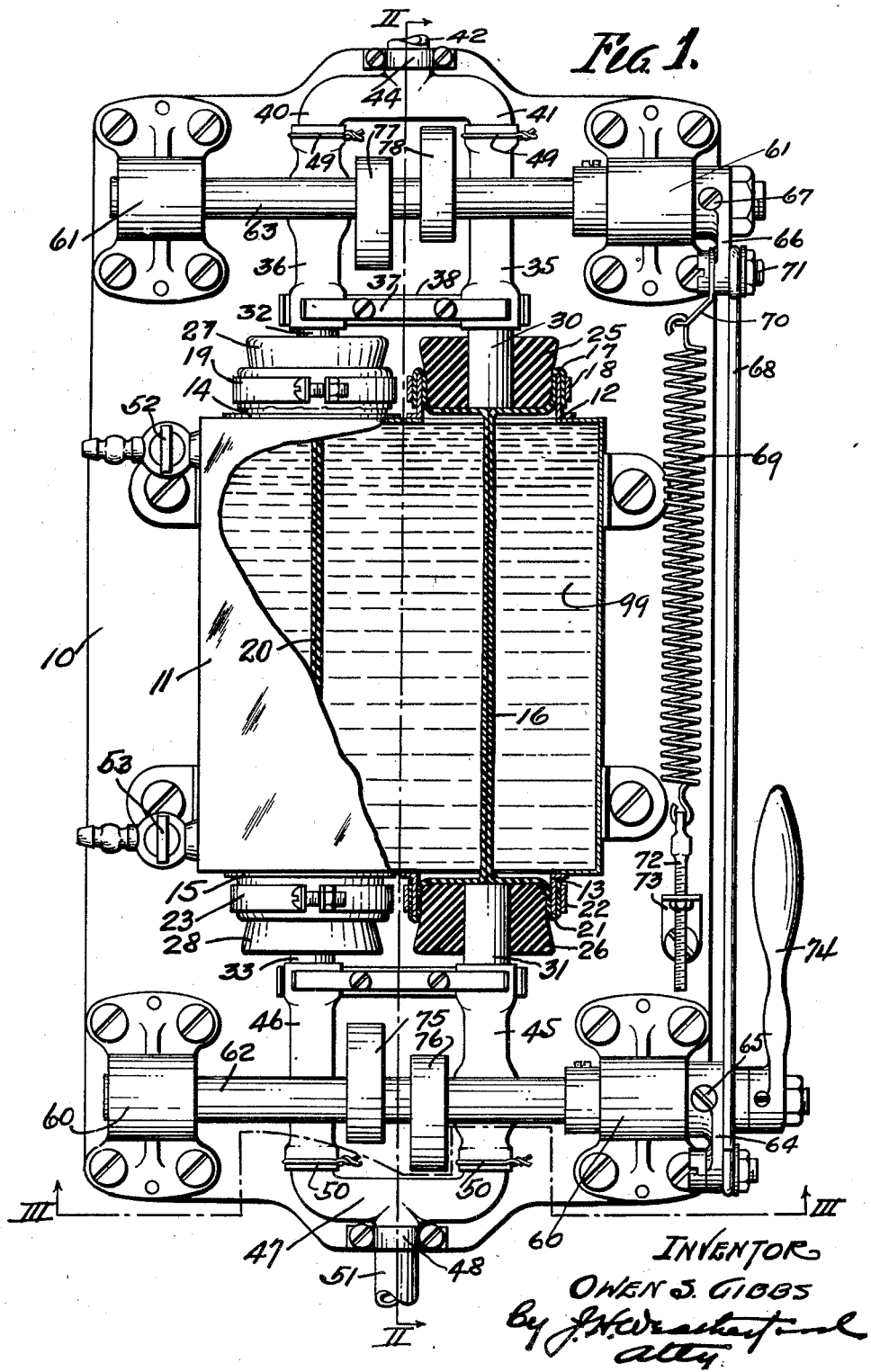
Fig. 1 is a front elevation partly in section of my improved measuring device.

Referring now to the drawings in which the various parts are indicated by numerals:

10 is a base on which is mounted a chamber 11, having rigid walls, the shape and size of this chamber being more or less immaterial. At the top and at the bottom, the chamber is outwardly flanged to provide four flanged openings, 12, 13, and 14, 15, respectively, the openings 12 and 13 being substantially vertically aligned and the openings 14 and 15 also similarly aligned. These flanged openings may be of any desired shape, but circular openings, under usual conditions, are most desirable. 16 is a flexible tube or bag of non-corrosive and resilient material, such as rubber, which extends from one flanged opening 12 to the opposite flanged opening 13. The end 17 of the bag is turned back over the flange 12 and is clamped around the outside thereof by a clamp 18, a similar clamp 19 being shown in the elevation clamping the adjacent bag 20 to the flange 14. The lower end 21 of the bag 16 is similarly turned back over the flange 13 and clamped therearound by a clamp 22, and the lower end of the bag 20 is similarly secured by a clamp 23.

25, 26, and 27, 28 are annular rubber plugs or stoppers within the upper and lower ends of the bags 16 and 20, respectively, these stoppers being inserted to tightly seat against the bags 16 and 20 and to seat these bags against the inside of the flanges 12, 13, 14 and 15.

30, 31 and 32, 33 are glass tubes projecting respectively through the stoppers 25, 26, and the stoppers 27, 28, these tubes tightly engaging their respective stoppers and projecting therefrom. Engaging the tubes 30 and 32 are rubber tubes 35 and 36, which are secured to the tubes, as by clamp members 37, 38, the latter of which members is secured through an interposed bracket 39 to the base 10. The upper ends of the tubes 35, 36 are secured on the branch ends 40, 41, of a T shaped glass tube having a vertically disposed stem tube 42 adapted to jointly feed both of them, this T shaped tube being secured through a bracket 43 and clamp 44 solidly to the base 10. Similarly at the lower end, the tubes 31 and 33 are connected by rubber tubes 45, 46 with a similar T shaped glass discharge tube 47 secured to the base 10 by a similar clamp 48. The tubes 35 and 36 are secured to branch tubes 40, 41 by clamp members 49 and the tubes 45 and 46 to the T shaped tube 47 by similar clamp members 50. The structure described provides duplicate hermetically closed passageways between the inlet tube 42 and the outlet stem 51 of the T shaped tube 47.

52 and 53 are pet cocks adapted to provide closures for tubes leading respectively into the upper and lower portions of the chamber 11, through which tubes the chamber may be filled or emptied. The upper of the cocks 52 is placed substantially at the top of the chamber, so as to prevent trapping of air in the chamber when it is being filled.

Cut-off closure of the tubes 35, 46 and 36, 45 is effected by collapse of these tubes by closure clamps, the action of these clamps being synchronized in such manner that the upper flexible tube 36 of one connection is closed at the same time as is the lower flexible tube 45 of the opposite channelway, and similarly the closure of the upper flexible tube 35 and the lower flexible tube 46 is synchronously accomplished as the other pair of tubes 36, 45 are opened up.

To effect these operations, 60 are brackets secured to and projecting from the lower part of the base 10, and 61 similar brackets at the upper part thereof. 62 is a shaft journalled in the brackets 60, and 63 a shaft journalled in the brackets 61. 64 is an arm secured to the shaft 62, as by a set screw 65, and 66 an arm similarly secured by a set screw 67 to the shaft 63. The outer ends of these arms are coupled by a link 68, so that the movement of one shaft, through the arms 64, 66, and the connecting link 68 moves the other shaft. 69 is a tension spring which, through a clip 70 and bolt 71, is secured to the arm 66; the other end of this spring being anchored through an adjustable bolt 72 and bracket 73 to the base 10. 74 is an operating arm suitably secured to the shaft 62 and adapted to be manually moved to actuate this shaft, return movement being accomplished by the spring 69.

75, 76 are a pair of cams secured in any usual or desired manner on the shaft 62; and 77, 78 a similar pair of cams secured on the shaft 63, both sets of cams being synchronously operated by the operation of the arm 74. Extending between the brackets 60, and supported thereby, are a pair of rods 80 which contact the sides of the tubes 45, 46, which are furthest from the base 10; and 81 are a similar pair of rods carried by the bracket 61, which are similarly disposed with respect to the tubes 35, 36. 83 is a spring which is secured to the base 10, as by a screw and washer 84. This spring has a coiled portion 85 and an arm portion 86, which latter portion lies between the tube 45 and the base 10. 87 is a continuation of the arm portion 86 of this spring, which continuation has a shoe portion 88 adapted to engage the cam 76. 90 is a second spring likewise secured to the base 10, which spring has a coiled portion 91, and an extension portion 92 underlying the arm portion 86 of the first spring and supplementing the action of such spring. A similar pair of springs, 93, 94, is provided for the tube 46, the spring 73 having a shoe portion 95 engaging the cam 75; a similar pair of springs (not shown) is used to close the tube 36, and an additional pair 97, 98 to effect the closure of the tube 35. 99 is a liquid within the chamber.

Fig. 4 shows a modification of the device which employs a base 10A, and chamber 11A, largely conforming to the previously described base 10 and chamber 11, the chamber having substantially identical pet cocks 52A and 53A controlling tubes leading thereinto. The chamber 11A is provided with flanged openings 14A and 15A vertically aligned and with a bag 20A of flexible impervious material, which bag is secured to the flanged openings by stoppers 27A, 28A respectively, substantially as before shown.

32A is a glass tube leading into the bag 20 through the stopper 27A. 100 is a cup shaped rubber stall closely fitting the outside of the tube 32A and the inside of the bore of the stopper 27A. The lower end of the stall is closed by a substantially hemispherical end, which, however, has a slit 101 cut therein, which slit will open to permit passage of liquid downward through the tube 32A and into the bag 20A, but will close against return flow upward through the tube 32A. The tube 32A is connected preferably by a rubber tube 102 with a container 103, which forms a source of supply for the liquid to be measured.

33A is a tube preferably of glass engaged in the stopper 28A and leading downward therefrom. 104 is a flexible tube as of rubber leading from the tube 33A. 105 is a clamp shown in plan in Fig. 5, which compresses and forms a closure valve for the tube 104. This valve is constructed to permit collapsing pressure on the bag 20A to force liquid from the bag therethrough, but is of sufficient strength to hold liquid within the bag 20A, except when under such collapsing pressure.

The chamber 11A is provided with an additional flanged opening 12A, which may be essentially similar to the flanged opening 12 of the preceding views and/or the flanged opening 14A. 110 is a sleeve of resilient impervious material, the upper end 111 of which sleeve is turned over the flange of the flanged opening 12A and is secured thereto by a clamp 18A. 112 is a plunger closed at its lower end, which slidably depends through the opening 12A, and at its lower end is secured by a clamp 113 to the lower end of the sleeve 110. 115 is a lever which is secured as by a link 116 and suitable pins 117, 118 to the upper end of the plunger 112. The lever 115 is pivotally mounted as on a pin 119 carried by a boss 120, which projects from the base 10A. 121 is a set screw lying in the path of movement of the lever 115, this screw being adjustable to form a stop limiting the upward stroke of the lever 115, and of the plunger 112 movable thereby and therewith.

In making use of that form of the device shown in Fig. 1, liquid 99, such as water, is introduced into the chamber 11 through the tubes controlled by the cocks 52, 53 until the chamber is entirely filled and both bags 16 and 20 are fully collapsed, care being taken to see that all air is expelled from the chamber. With the chamber so filled, the device is ready for calibration. To calibrate the subsequent measurements, the cock 53 is opened and an amount of liquid is withdrawn from the chamber which is equal to the amount which is to be measured by the subsequent use of the device.

If not already previously done, the tube 42 is connected to a supply of liquid to be measured, such a source and connection being indicated in Fig. 4 by the numerals 103, 102. With this supply connected, liquid flows through the tube 42, the branch tube 41, the tube 35 and the tube 30 into the bag 16, displacing the air drawn thereinto when liquid 99 was removed from the chamber in calibrating. In this filling of the bag 16 the clamp 80, 87, forms a closure for the tube 45 and the lower end of the bag 16. The operating arm 74 is now shifted to open the valve closing the tube 45, and to concurrently close the tube 46. This action also, through the link 68 and the cams carried thereby, closes the tube 35 and opens the tube 36. In this action the closure of the tube 35 is effected before the tube 45 is opened; and similarly the tube 46 is closed before the tube 36 is opened. Liquid within the bag 16 can, therefore, not escape until distension of the bag 20 occurs, and only in an amount equal to the distension of such bag. With the tube 36 open, liquid flows through the tube 42 and the branch 40, the tube 36 and the tube 32 into the bag 20. The pressure of the liquid flowing through the tube 42 and the weight of the liquid in bag 16 co-operate to entirely empty the bag 16 and to equally fill the bag 20. Reverse movement of the operating arm 74 will now shift the closure valves and empty the bag 20 and refill the bag 16, each discharge from the bag 16 and from the bag 20 successively being equal in amount to the liquid first withdrawn from the chamber 11.

It will be understood that in the first few measurements some air may be entrained in the tubes leading to and from the bags 16 and 20 and that such measurements may be inaccurate. It is found, however, that after one or two operations all the air has been displaced and subsequent measurements are exact and truly represent an amount of liquid equal to that which was withdrawn from the chamber 11. The speed at which the measurements are made will therefore depend primarily on the speed at which the arm 74 is shifted. It will be understood that although the shift is shown as being adapted to be made manually, that a mechanical drive may be installed should it be so desired.

The operation of that form of the device shown in Fig. 4 is essentially similar. With the plunger 112 raised until the lever 115 is against the stop 121, liquid is introduced through the cocks, 52A, 53A, into the chamber 11A until the bag 20A is entirely collapsed, and the chamber entirely filled with liquid, all air as before being driven out. The source of supply 103 is filled with liquid to be dispensed and the device is ready for calibration. Calibration is effected by opening the cock 52A, or cock 53A and depressing the lever 115 to force liquid from the chamber 11A, the amount of liquid so discharged being measured and exactly such amount removed as in subsequent use is to be duplicated. The cock which was opened is then closed and the device is ready for use.

In use the pressure on the lever 115 is released and the resilience of the rubber sleeve allowed to raise the plunger until the lever comes against the stop 121, at which time an amount of liquid equal to that removed from the chamber will have entered the bag 20A. The lever is then pushed downward until stopped by the complete collapse of the bag and ejectment of the charge therefrom, and the operation repeated so long as desired.

It will be noted that in both forms of the device, dependence is had on the rigidity of the chamber and the inherent incompressibility of the liquid in the chamber. It will also be seen that the liquid measured is at all times separated by an impervious wall from the liquid of the actuating device.

It will also be understood that while the device is primarily for the measurement of liquids, that it may be used for the measurement of gases also, should it be so desired, the gas containers and connections obviously in such use being all gas tight.

It will be understood that the details of construction here shown may be varied from, without departing from the spirit of my invention and I therefore do not intend to limit myself to such details, except as they may be specifically set out in any claim.

What I claim:

1. A measuring apparatus, including a chamber having substantially rigid walls, a bag of impervious flexible material disposed in said chamber and a liquid entirely filling said chamber exterior to said bag, but collapsing said bag only a predetermined and limited amount; a valve-controlled inlet tube leading into said bag, a valve-controlled outlet tube leading therefrom, means for supplying a liquid to be measured through said inlet tube, and means for alternately collapsing said bag to discharge same, and relieving pressure thereon to permit same to refill.

2. A measuring apparatus, including a chamber having substantially rigid walls, a bag of impervious flexible material disposed in said chamber and a liquid entirely filling said chamber exterior to said bag, but collapsing said bag only a predetermined and limited amount, an inlet tube leading into said bag, an outlet tube leading therefrom, valves, each respectively controlling one of said tubes, means for synchronously actuating said valves, means for supplying a liquid to be measured to said inlet tube and means for alternatingly collapsing said bag and relieving pressure thereon to permit same to refill from said supply.

3. A measuring apparatus, including a chamber having substantially rigid walls, a bag of impervious flexible material disposed in said chamber, valve controlled means for filling said chamber and a liquid entirely filling said chamber exterior to said bag, but collapsing said bag only a predetermined and limited amount, an inlet tube leading into said bag, an outlet tube leading therefrom, valves, each respectively controlling flow through one of said tubes, means for supplying a liquid to be measured through said inlet tube and means for alternately collapsing said bag, and relieving pressure thereon to permit same to refill from said supply.

4. A measuring apparatus, including a chamber having substantially rigid walls, a complementary pair of bags of impervious flexible material disposed in said chamber, and a liquid entirely filling said chamber exterior to said bags, said liquid collapsing one of said bags fully, but collapsing the other only a predetermined and limited amount, supply tubes, each leading into a said bag, and discharge tubes, each leading from a said bag, valve means each respectively adapted to open and close one of said tubes, valve operating means, means adapted to synchronize said opening means to effect the closure of the supply tube valve to a first said bag concurrently with the closure of the discharge tube valve of the other said bag, and to synchronize the opening of the supply tube valve of the latter said bag with the opening of the discharge tube valve of the first said bag.

5. A measuring apparatus, including a chamber having substantially rigid walls, a complementary pair of bags of impervious flexible material disposed in said chamber, and a liquid entirely filling said chamber exterior to said bags, said liquid collapsing both of said bags fully, means for drawing liquid from said chamber to permit a desired distension of said bags, supply tubes each respectively leading into a said bag, and discharge tubes each respectively leading from a said bag, valve means each respectively adapted to open and close one of said tubes, valve operating means, means adapted to synchronize said operating means to effect the closure of the supply tube valve to a first said bag concurrently with the closure of the discharge tube valve of the other said bag and to synchronize the opening of the supply tube valve of the latter said bag with the opening of the discharge tube valve of the first said bag.

6. A measuring apparatus, including a chamber having substantially rigid walls, a complementary pair of bags of impervious flexible material disposed in said chamber, and a liquid entirely filling said chamber exterior to said bags, said liquid collapsing one of said bags fully, but collapsing the other only a predetermined and limited amount, a first and a second supply tube leading respectively into the first and the second of said bags, and a first and a second discharge tube leading respectively from said first and second bags, valve means each adapted to open and close one of said tubes, valve operating means adapted to concurrently close said first supply tube and open said second supply tube, said means being reversible to open said first tube and close said second tube, valve operating means adapted to concurrently open said first discharge tube and close said second discharge tube, said means being reversible to close said first tube and open said second tube, and means linking the first said valve operating means and the second said means.

7. A measuring apparatus, including a chamber having substantially rigid walls, a bag of resilient, impervious material therein, a supply tube leading into said bag, a check valve preventing return flow from said bag to said tube, a discharge tube leading from said bag, valve means closing said discharge pipe but adapted to allow discharge under pressure, a plunger reciprocably mounted through a wall of said chamber, and adapted to be disposed largely within said chamber, means for reciprocating said plunger and a fluid filling said chamber and collapsing said bag when said plunger is forced into said chamber.

8. A measuring apparatus, including a chamber having substantially rigid walls, a bag of resilient, impervious material therein, a supply tube leading into said bag, a check valve preventing return flow from said bag to said tube, a discharge tube leading from said bag, valve means closing said discharge pipe, but adapted to allow discharge under pressure, a plunger reciprocably mounted through a wall of said chamber, and adapted to be disposed largely within said chamber, means for reciprocating said plunger, means for limiting withdrawal of said plunger, and a fluid filling said chamber and collapsing said bag when said plunger is forced into said chamber.

9. A measuring apparatus, including a chamber having substantially rigid walls, a bag of resilient, impervious material therein, a supply tube leading into said bag, a check valve preventing return flow from said bag to said tube, a discharge tube leading from said bag, valve means closing said discharge pipe, but adapted to allow discharge under pressure, a plunger reciprocably mounted through a wall of said chamber, a lever coupled to said plunger and adapted to move said plunger into or withdraw same from said chamber, an adjustable stop co-operating with said lever to limit such withdrawal, and a fluid filling said chamber and collapsing said bag when said plunger is moved fully into said chamber by said lever.

OWEN S. GIBBS.